United States Patent
Watanabe

(10) Patent No.: US 8,368,729 B2
(45) Date of Patent: Feb. 5, 2013

(54) DISPLAY DEVICE

(75) Inventor: Hisashi Watanabe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 391 days.

(21) Appl. No.: 12/743,882

(22) PCT Filed: Nov. 17, 2008

(86) PCT No.: PCT/JP2008/003347
§ 371 (c)(1),
(2), (4) Date: May 20, 2010

(87) PCT Pub. No.: WO2009/066436
PCT Pub. Date: May 28, 2009

(65) Prior Publication Data
US 2010/0259566 A1   Oct. 14, 2010

(30) Foreign Application Priority Data
Nov. 22, 2007   (JP) .................................. 2007-303624

(51) Int. Cl.
G09G 5/10   (2006.01)
(52) U.S. Cl. ........................... 345/690; 345/1.3; 359/630
(58) Field of Classification Search ............ 345/1.1–1.3, 345/102, 690–694; 359/619, 629, 630
See application file for complete search history.

(56) References Cited

U.S. PATENT DOCUMENTS 5,734,513 A * 3/1998 Wang et al. .................... 359/742
5,828,410 A * 10/1998 Drapeau ......................... 348/383
6,177,912 B1 * 1/2001 Izumi ............................. 345/1.3
6,483,482 B1   11/2002 Kim
6,724,354 B1 * 4/2004 Spitzer et al. ................... 345/32
(Continued)

FOREIGN PATENT DOCUMENTS

JP   63-61886 U   4/1988
JP   01-142614 A   6/1989
(Continued)

OTHER PUBLICATIONS

Official Communication issued in International Patent Application No. PCT/JP2008/003347, mailed on Dec. 9, 2008.
(Continued)

Primary Examiner — Kimnhung Nguyen
(74) Attorney, Agent, or Firm — Keating & Bennett, LLP

(57) ABSTRACT

A direct-viewing type display device according to the present invention includes: at least one display panel having a display region and a frame region formed outside of the display region; and at least one Fresnel lens plate disposed on a viewer side of the at least one display panel with a predetermined interval therefrom. The Fresnel lens plate includes a Fresnel lens region at a position overlapping a region that contains a portion of the frame region of the display panel and a portion of a peripheral display region within the display region that adjoins the portion of the frame region along a first axis. A portion of display light exiting the portion of the peripheral display region is emitted from a region of the Fresnel lens region that overlaps a portion of the frame region, or a region outside the region, toward the viewer side. According to the present invention, there is provided a direct-viewing type display device in which a frame region of a display panel, or a joint in the case of tiling, is made unlikely to be seen, with a structure which is more simple and light-weighted than conventionally.

12 Claims, 10 Drawing Sheets

U.S. PATENT DOCUMENTS

| | | | |
|---|---|---|---|
| 6,927,908 B2 | 8/2005 | Stark | |
| 7,414,594 B2 * | 8/2008 | Kim et al. | 345/1.3 |
| 2008/0110358 A1 * | 5/2008 | Kanga | 101/401.1 |

FOREIGN PATENT DOCUMENTS

| | | |
|---|---|---|
| JP | 05-143007 A | 6/1993 |
| JP | 05-188873 A | 7/1993 |
| JP | 2000-180964 A | 6/2000 |
| JP | 2003-157031 A | 5/2003 |

OTHER PUBLICATIONS

English translation of Official Communication issued in corresponding International Application PCT/JP2008/003347, mailed on Jun. 17, 2010.

Watanabe et al., "Display Device," U.S. Appl. No. 13/000,693, filed Dec. 22, 2010.

Watanabe et al., "Display Device and Electronic Device," U.S. Appl. No. 13/000,687, filed Dec. 22, 2010.

* cited by examiner (a)

(b)

(c)

DISPLAY DEVICE

TECHNICAL FIELD

The present invention relates to a display device, and in particular to a direct-viewing type display device.

BACKGROUND ART

In recent years, there is a strong desire for an increase in the size of television sets and display devices for displaying information. Representative examples of large-sized display devices are display devices in which self-emission elements such as light-emitting diodes (LEDs) are arranged in a matrix array and projection display devices; however, these have disadvantages in terms of image quality. Therefore, a further increase in the size of direct-viewing type liquid crystal display devices (LCDs) and plasma display devices (PDPs), which are capable of displaying with a high image quality, is being desired.

Since a direct-viewing type liquid crystal display device or a plasma display device is basically formed on a glass substrate, its screen size depends on the substrate size. Currently, the largest of glass substrates (mother substrates) that are used for the production of liquid crystal display devices are those of the eighth generation (2200 mm×2400 mm), and liquid crystal display devices whose diagonal is about 100 inches are being produced by using these substrates. The substrates that are available for mass production will become more increased in size, however at a slow rate. It is difficult to immediately provide display devices with the larger areas that are required on the current market.

Therefore, as a method of realizing a large-screen display device, there has been a conventional attempt of realizing a make-believe large-screen display device by arraying a plurality of display devices (which may be referred to as tiling). However, the tiling technique induces a problem of visible joints between the plurality of display devices. This problem will be described by taking a liquid crystal display device for example.

Note that a liquid crystal display device mainly includes a liquid crystal display panel, a backlight device, circuits for supplying various electrical signals to the liquid crystal display device, and a power supply, as well as a housing in which to accommodate these. The liquid crystal display panel is mainly composed of a pair of glass substrates and a liquid crystal layer interposed therebetween. On one of the glass substrates, a color filter layer and a counter electrode are formed, whereas on the other glass substrate, TFTs, bus lines, a driving circuit for supplying signals to them, and the like are formed. The screen size of a direct-viewing type liquid crystal display device is determined by the screen size of the liquid crystal display panel. The liquid crystal display panel has a display region which is composed of a plurality of pixels, and a frame region surrounding it. In the frame region, a sealing portion with which to attach the pair of substrates together and also seal and retain the liquid crystal layer, an implementation of driving circuitry for driving the pixels, and the like are formed.

Thus, since the frame region not contributing to any displaying exists in a liquid crystal display panel, when a large screen is constructed by arraying a plurality of liquid crystal display panels, the image will have joints. This problem is not limited to liquid crystal display devices, but is shared among direct-viewing type display devices, e.g., PDPs, organic EL display devices, and electrophoresis display devices.

Accordingly, Patent Documents 1 and 2 show constructions in which a translucent cover is provided on the front face of a display panel. A large part of the cover corresponding to the display region is made flat, so that the image appears substantially undistorted. On the other hand, portions of the cover corresponding to the frame region and the display region near the frame region are bent, so that light which is emitted from the portions of the display region near the frame region is refracted, thus enabling displaying with no joints even in the non-display region.

[Patent Document 1] Japanese Laid-Open Patent Publication No. 5-188873

[Patent Document 2] Japanese National Phase PCT Laid-Open Publication No. 2004-524551

DISCLOSURE OF INVENTION

Problems to be Solved by the Invention

However, adopting a construction in which edge portions of a transparent cover are bent to refract light will induce the following problems.

For example, consider a display device in which two 100 inch liquid crystal display panel are placed side by side. The width of the frame region of a 100 inch liquid crystal display panel is about 24 mm on each side. Therefore, 48 mm of the frame region (non-display region) totaling the right and left needs to be made invisible. If a commonly-used acrylic resin is used to construct a conventional transparent cover having bent edge portions, a cover having a thickness of 100 mm or more is required, thus resulting in a mass of 400 kg or more.

Thus, adopting the conventional method of utilizing bent edge portion shapes has a problem of making the cover large and heavy, which will require a considerable structure for fixing the cover. It is practically difficult to construct an especially large display device.

The present invention has been made in view of the above problems, and an objective thereof is to provide a direct-viewing type display device in which a frame region of a display panel, or a joint in the case of tiling, is made unlikely to be seen, with a structure which is more simple and light-weighted than conventionally.

Means for Solving the Problems

A direct-viewing type display device according to the present invention comprises: at least one display panel having a display region and a frame region formed outside of the display region; and at least one Fresnel lens plate disposed on a viewer side of the at least one display panel with a predetermined interval therefrom, characterized in that: the at least one Fresnel lens plate includes a Fresnel lens region at a position overlapping a region that contains a portion of the frame region of the at least one display panel and a portion of a peripheral display region within the display region that adjoins the portion of the frame region along a first axis; and a portion of display light exiting the portion of the peripheral display region is emitted from a region of the Fresnel lens region that overlaps a portion of the frame region, or a region outside the region, toward the viewer side.

In one embodiment, the at least one display panel includes a plurality of pixels arrayed with a constant pitch across the entire display region; and displays signal to be supplied to a plurality of pixels existing in the portion of the peripheral display region are compressed along the first axis.

In one embodiment, the display signals to be supplied to a plurality of pixels existing in the portion of the peripheral display region are compressed along the first axis at different compression ratios. Preferably, the compression ratios are set so that, when an image is observed at an angle θ from the display plane normal, light traveling through the Fresnel lens region forms a continuous image along the first axis.

In one embodiment, the at least one display panel includes two display panels disposed so as to adjoin each other along the first axis; and the Fresnel lens region of the at least one Fresnel lens plate is a continuous region containing portions of the frame regions of the two display panels such that the portions adjoin each other along the first axis.

In one embodiment, the two display panels include a plurality of pixels arrayed with a constant pitch across the entire display region; and the display signals to be supplied to a plurality of pixels existing in the portion of the peripheral display region are compressed along the first axis.

In one embodiment, wherein the display signals to be supplied to a plurality of pixels existing in the portion of the peripheral display region are compressed along the first axis at different compression ratios. Preferably, the compression ratios are set so that, when an image is observed at an angle θ from the display plane normal, light traveling through the Fresnel lens region forms a continuous image along the first axis.

In one embodiment, the display signals to be supplied to a plurality of pixels existing in the portions of the peripheral display regions adjoining the portions of the frame regions of the two display panels such that the portions adjoin each other along the first axis contain identical display signals.

One embodiment includes a pillar disposed in the portions of the frame regions of the two display panels such that the portions adjoin each other along the first axis, the pillar maintaining the predetermined interval between the two display panels and the at least one Fresnel lens plate.

In one embodiment, the relationship a<d·X/Y is satisfied, where, a is a width of the pillar along the first axis; d is a thickness of the at least one Fresnel lens plate; X is an overall width of the portions of the frame regions of the two display panels such that the portions adjoin each other along the first axis; and Y is a distance from viewer side surfaces of display medium layers of the two display panels to a viewer side surface of the at least one Fresnel lens plate.

In one embodiment, the Fresnel lens region includes a plurality of ridges extending along a second axis which is perpendicular to the first axis, the second axis being parallel to pixel rows of the at least one display panel.

In one embodiment, luminance of display light emitted from the at least one display panel is higher in the portion of the peripheral display region than in any other portion.

A display device of one embodiment is a display device further comprising a backlight device, wherein, the at least one display panel is a liquid crystal display panel; and an intensity of light emitted from the backlight device toward the portion of the peripheral display region is higher than an intensity of light emitted toward any other portion.

In one embodiment, the Fresnel lens region includes a plurality of ridges, the plurality of ridges being formed on the viewer side.

In a display device of one embodiment, the at least one display panel is accommodated in a housing, the Fresnel lens region of the at least one Fresnel lens plate having a portion overlapping the housing.

Effects of the Invention

According to the present invention, there is provided a display device in which a frame region of a display panel, or a joint in the case of tiling, is unlikely to be seen, with a structure which is more simple and light-weighted than conventionally. Moreover, according to the present invention, by merely placing an appropriately designed Fresnel lens plate at a predetermined position of an existing display panel or display unit (composed of a display panel and the like accommodated in a housing), a frame region of a display panel, or a joint in the case of tiling, can be made unlikely to be seen.

DESCRIPTION OF REFERENCE NUMERALS

| | |
|---|---|
| 10, 20 | liquid crystal display panel |
| 10D, 20D | peripheral display region |
| 10F, 20F | frame region |
| 15, 25 | backlight device |
| 18, 28, 40L | Fresnel lens region |
| 17, 27 | display region (excluding peripheral display region) |
| 30 | non-display region |
| 40 | Fresnel lens plate |
| 41 | pillar |
| 100A, 100B, 100C, 100D | direct-viewing type display device |

BEST MODE FOR CARRYING OUT THE INVENTION

Hereinafter, an embodiment of the present invention will be described with reference to the drawings. However, the present invention is not limited to the illustrated embodiment.

Figure 1:
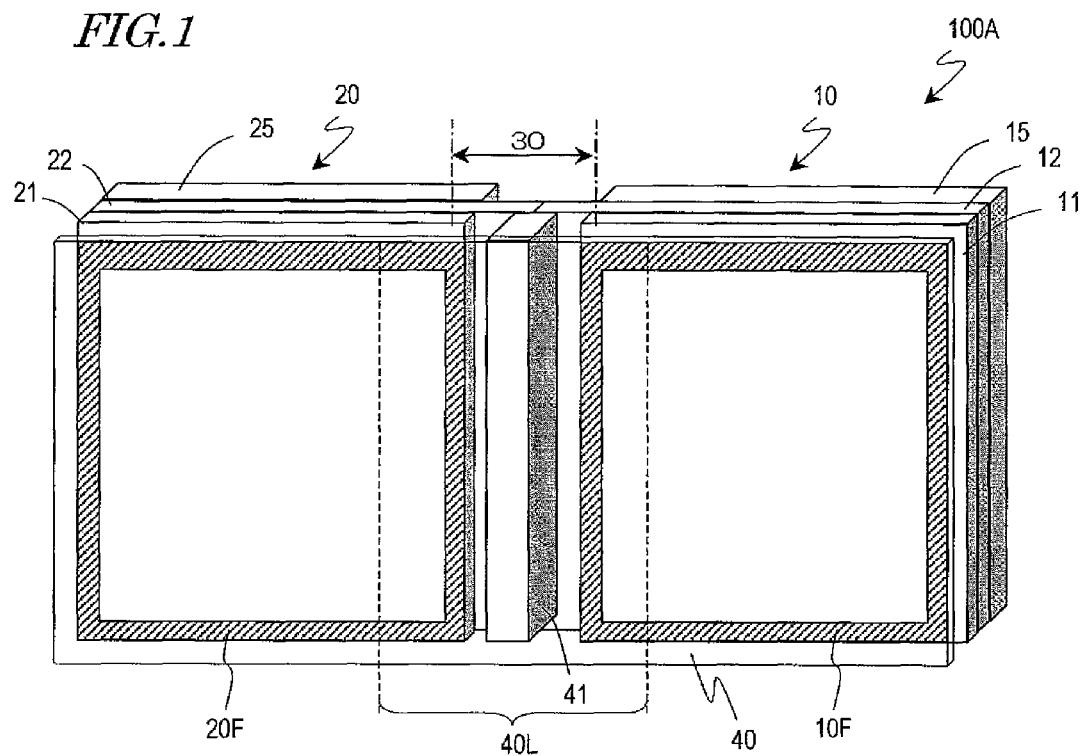
FIG. 1 A schematic perspective view of a display device 100A according to an embodiment of the present invention.
Figure 2:
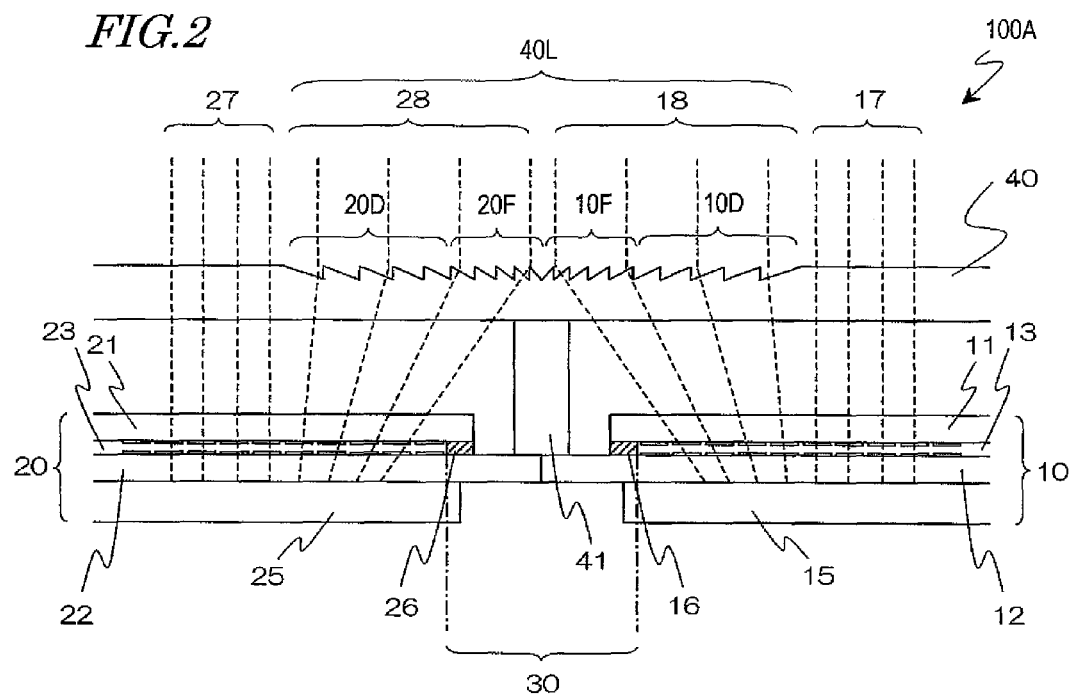
FIG. 2 A schematic cross-sectional view of the display device 100A according to an embodiment of the present invention.

FIG. 1 and FIG. 2 schematically show a direct-viewing type display device 100A according to an embodiment of the present invention. FIG. 1 is a schematic perspective view of the display device 100A as seen from the viewer side. FIG. 2 is a schematic cross-sectional view of the display device 100A, where the upper side in the figure corresponds to the viewer side. Although a liquid crystal display device in which a liquid crystal display panel is used as the display panel will be illustrated below, this is not a limitation; a display panel for PDP, an organic EL display panel, or an electrophoresis display panel can be used.

The liquid crystal display device 100A includes two liquid crystal display panels 10 and 20. The liquid crystal display panels 10 and 20 each have a display region and a frame region 10F or 20F formed outside of the display region. The liquid crystal display device 100A includes a Fresnel lens plate 40 which is disposed on the viewer side of the liquid crystal display panels 10 and 20 at a predetermined interval (air layer) therefrom. The interspace between the Fresnel lens plate 40 and the liquid crystal display panels 10 and 20 is maintained by a pillar 41, which is disposed at portions (a non-display region 30) of the frame regions 10F and 20F adjoining each other along a first axis. On the rear face side (i.e., the opposite side from the viewer side) of the liquid crystal display panels 10 and 20, backlight devices 15 and 25 are provided. Herein, as the backlight devices 15 and 25, direct type backlights in which a multitude of fluorescent lamps are arrayed are used.

The Fresnel lens plate 40 has a Fresnel lens region 40L at a position overlapping a region that contains: portions of the frame regions 10F and 20F of the liquid crystal display panels 10 and 20; and portions of a peripheral display region within the display region that adjoin the portions of the frame regions 10F and 20F along a first axis (which herein is parallel to the horizontal direction on the display plane). Herein, the Fresnel lens region 40L is a continuous region that contains portions of the frame regions 10F and 20F of the two liquid crystal display panels 10 and 20, such that the portions adjoin each other along the first axis.

The region not contributing to displaying, which includes the frame regions 10F and 20F as well as, if any, the interspace or connecting portion therebetween will be collectively referred to as a non-display region 30. In the Fresnel lens region 40L, a portion corresponding to the liquid crystal display panel 10 may be referred to as a Fresnel lens region 18, whereas a portion corresponding to the liquid crystal display panel 20 may be referred to as a Fresnel lens region 28. In the display region of the liquid crystal display panel 10, the portion excluding the peripheral display region 10D, i.e., the portion at which display light is emitted toward the viewer not by way of the Fresnel lens region 18, will be denoted by the reference numeral 17. Similarly, in the display region of the liquid crystal display panel 20, the portion excluding the peripheral display region 20D, i.e., the portion at which display light is emitted toward the viewer not by way of the Fresnel lens region 28, will be denoted by the reference numeral 27.

Although a construction in which the liquid crystal display panels 10 and 20 are disposed so as to adjoin each other is illustrated herein, a liquid crystal display unit composed of the liquid crystal display panel 10 and a backlight device 15 accommodated in a housing, and a liquid crystal display unit composed of the liquid crystal display panel 20 and a backlight device 25 accommodated in a housing may be disposed so as to adjoin each other. It will be appreciated that the Fresnel lens region 40L shall be a region including a portion overlapping the adjoining portions of the housings.

As shown in FIG. 2, the Fresnel lens region 40L includes a plurality of ridges extending along a second axis (which herein is parallel to the vertical direction on the display plane) that is perpendicular to the first axis. The Fresnel lens region 40L functions as a so-called linear Fresnel lens. Herein, by arranging the second axis to be substantially perpendicular to pixel columns of the liquid crystal display panels 10 and 20, i.e., color filter columns, occurrence of moire can be suppressed. Unlike in commonly-used arrays, the pixel columns (color filter columns) of the liquid crystal display panel are arrayed parallel to the horizontal direction on the display plane. For example, R, G, and B color filters extend parallel to the horizontal direction on the display plane, and are arrayed in stripes along the vertical direction (second axis).

Portions of the display light which are emitted from the portions 10D and 20D of the peripheral display regions of the liquid crystal display panels 10 and 20 enter the Fresnel lens region 40L, and go out from regions of the Fresnel lens region 40L that overlap portions of the frame regions 10F and 20F, or regions outside these regions, toward the viewer side. The display light which is emitted from the Fresnel lens region 40L is refracted in the display plane normal direction. In this manner, display light exiting the peripheral display regions 10D and 20D of the liquid crystal display panels 10 and 20 forms an image without joints; that is, the non-display region 30 is prevented from being visually recognized.

Note that the liquid crystal display panel 10 has a structure such that, for example, a liquid crystal layer 13 is sealed between translucent substrates 11 and 12 on which transparent electrodes are formed in a matrix shape, with polarizers being disposed on the surfaces of the substrates 11 and 12 not facing the liquid crystal layer. Similarly to the liquid crystal display panel 10, the liquid crystal display panel 20 has a structure such that a liquid crystal layer 23 is sealed between translucent substrates 21 and 22, with polarizers being disposed on the surfaces of the substrates 21 and 22 not facing the liquid crystal layer. The backlight device 25 is provided on the outside of the substrate 22. Moreover, in the frame regions 10F and 20F of the liquid crystal display panels 10 and 20, sealing portions 16 and 26 for sealing liquid crystal in, driving circuitry for driving the pixels, and the like are included.

Figure 3:
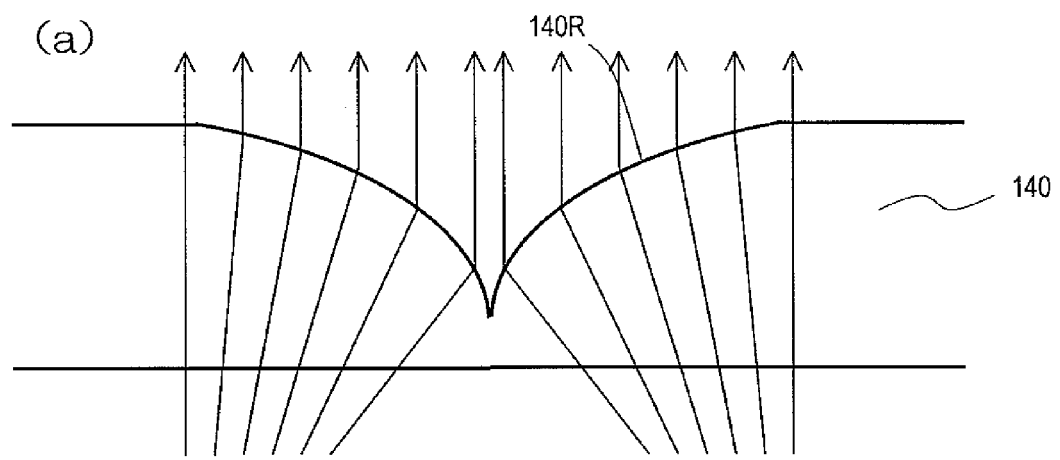
FIG. 3(a) to (c) are schematic diagrams for describing the construction and action of a Fresnel lens region 40L of a Fresnel lens plate 40.
Figure 3:
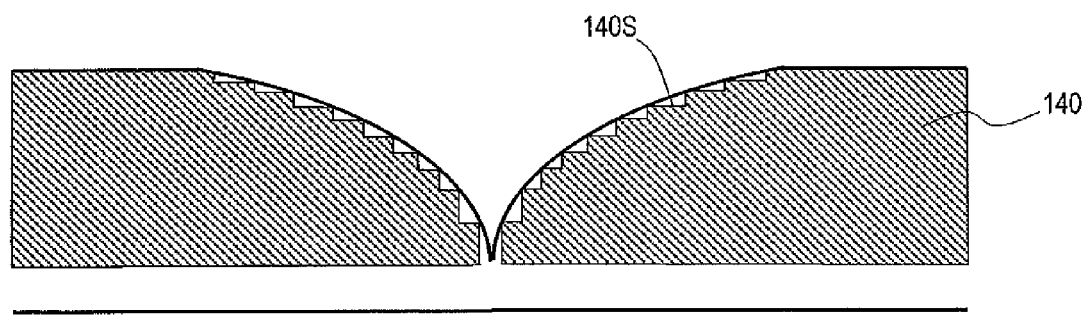
Figure 3:
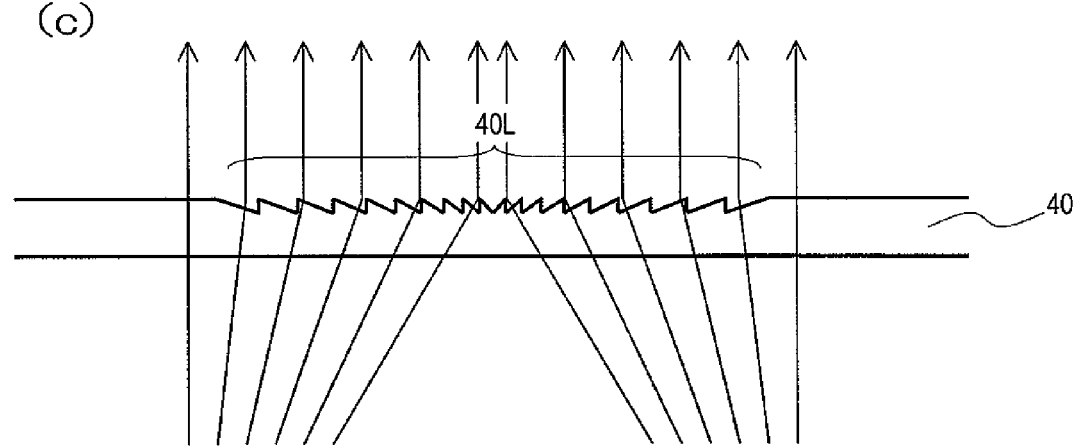

Next, with reference to FIG. 3, the construction and action of the Fresnel lens region 40L of the Fresnel lens plate 40 will be described.

FIG. 3(a) is a diagram schematically showing convex lens shapes serving as a basis for the design of the Fresnel lens; FIG. 3(b) is a diagram schematically showing portions (hatched portions) to be removed when converting the convex lens shapes into a Fresnel lens; and FIG. 3(c) shows the Fresnel lens shape after conversion.

The convex lens shapes 140 shown in FIG. 3(a), serving as the basis, are V-groove shaped such that a valley portion 140R between the two convex lens shapes rests on a planar plate. The valley portion of the V-groove is designed so as to coincide with the center in the non-display regions of the two display panels (reference numeral 30 in FIG. 2).

Since light travels straight in portions 140S shown hatched in FIG. 3(b) inside the convex lens shapes 140, optically similar effects can be obtained without the hatched portions 140S. By removing the hatched portions 140S and forming only a lens portion in the shape of a planar plate, a region 40L having a Fresnel lens shape as shown in FIG. 3(c) is obtained. The Fresnel lens region 40L exhibits about the same optical characteristics as those of the convex lens shapes 140 of FIG. 3(a).

The Fresnel lens plate 40 having the Fresnel lens region 40L obtained in this manner is fixed in front of the display panels 10 and 20 with a predetermined interval therefrom.

Figure 4:
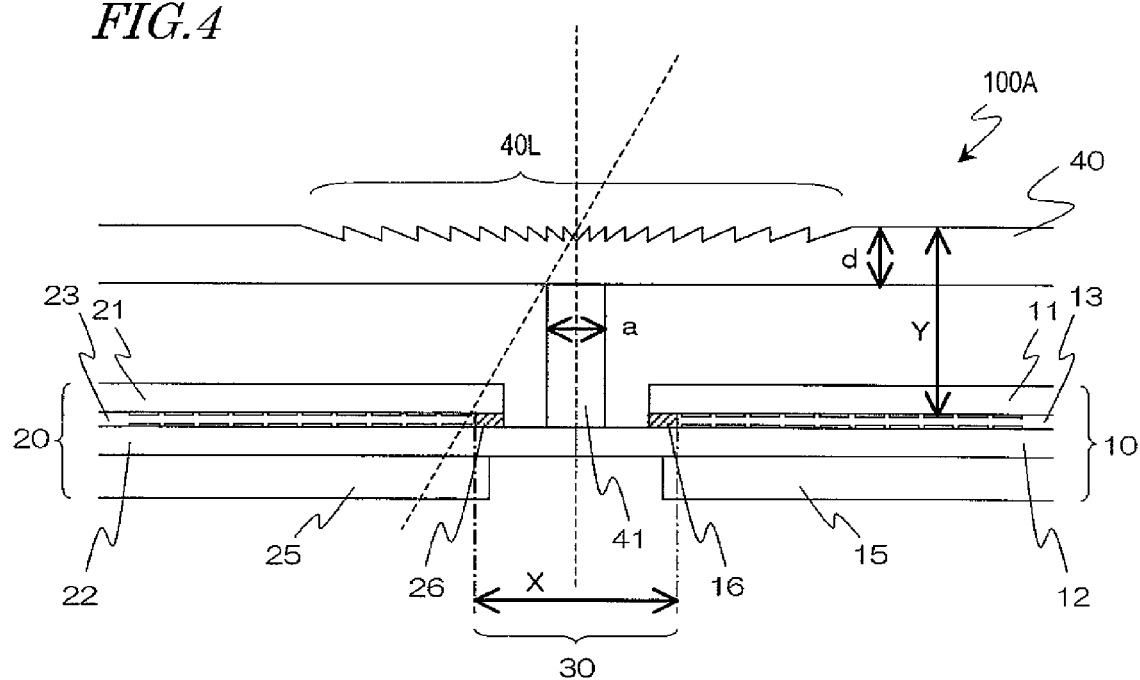
FIG. 4 A schematic diagram for describing an example of a specific construction of the Fresnel lens plate 40.

With reference to FIG. 4, a specific example of the Fresnel lens plate 40 is shown. In the case where the width X of the non-display region 30 is 48 mm, if V-groove shaped convex lens shapes with a radius of curvature 110 mm are made into a Fresnel lens, its thickness d is 2 mm; the Fresnel lens region 40L has a width of 190 mm; and the distance Y between the Fresnel lens plate 40 and the display panel is 54 mm.

As the Fresnel lens plate 40, a transparent acryl plate was used, and the Fresnel lens was formed via a cutting process. When taking mass producibility into consideration, it is preferable to adopt a molding technique via resin transfer.

The Fresnel lens plate 40 will weigh about 16 kg even when it is as large as two 100 inch display panels. This is a considerable reduction in weight over the conventional example, thus presenting practicality.

Herein, from the standpoint of display quality, it is preferable that the Fresnel lens plate 40 is formed so as to be larger than the total area of the display regions of at least two display panels, and fixed outside the display regions.

When the Fresnel lens plate 40 has a thin thickness, flexure and warp will be a problem, and thus it is preferable to use the pillar 41 to fix it to the display device upon the non-display region 30.

As shown in FIG. 4, assuming that the Fresnel lens plate has a thickness d; the non-display region has a width X; and the distance from the viewer side surfaces of the liquid crystal layers (display medium layers) 13 and 23 of the display panels 10 and 20 to the viewer side surface of the Fresnel lens plate 40 is Y, then, it is preferable that the width a of the pillar 41 satisfies the relationship of $a < d \cdot X/Y$ (eq. 1). In the above-described present embodiment, it is preferable that $a < 1.77$ mm.

Figure 5:
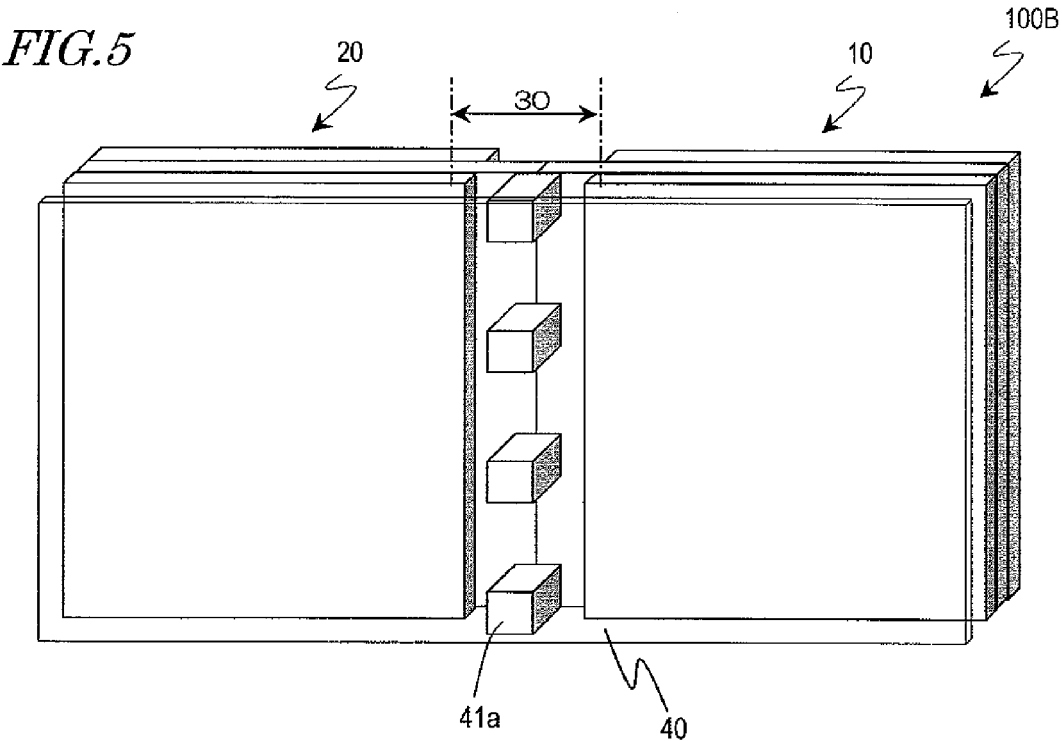
FIG. 5 A schematic perspective view of another display device 100B according to an embodiment of the present invention.

As for the shape of the pillar 41, preferably its width a does not exceed the range of eq. 1, and it is not limited to an elongated rectangular solid shape (wall shape) as shown in FIG. 1. For example, as in pillars 41a of a display device 100B shown in FIG. 5, a plurality of relatively small structures having e.g. square or circle cross-sectional shapes may be provided.

Figure 6:
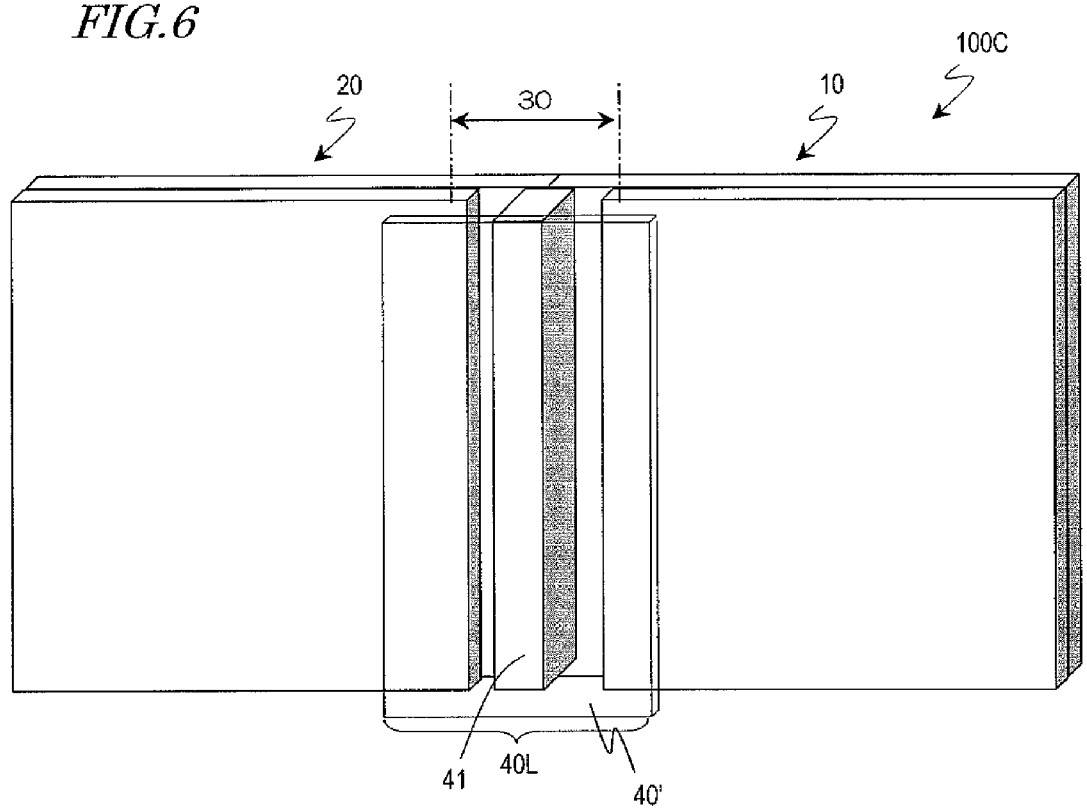
FIG. 6 A schematic perspective view of another display device 100C according to an embodiment of the present invention.
Figure 7:
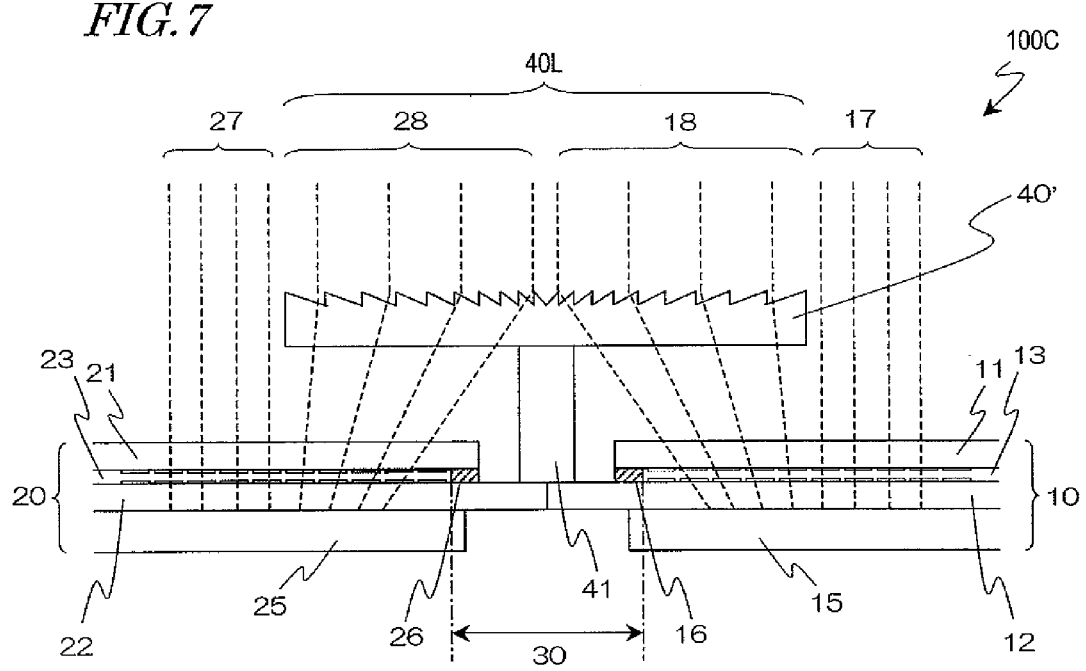
FIG. 7 A schematic cross-sectional view of the other display device 100C according to an embodiment of the present invention.

Since any region of the Fresnel lens plate 40 other than the Fresnel lens region 40L is optically unnecessary, as in a display device 100C shown in FIG. 6 and FIG. 7, a Fresnel lens plate 40' which only has the Fresnel lens region 40L may be used. By adopting this construction, it becomes possible to further reduce the weight of the Fresnel lens plate 40'. Furthermore, by adopting a detachable structure at the face of the pillar 41 where it is connected to the display panels 10 and 20, with a tackiness agent or the like, it becomes possible to switch between a mode of use in which the display panels 10 and 20 are individually used and a mode of use in which the Fresnel lens plate 40' is attached in place to enable large-screen displaying, depending on the need.

Note that, when the Fresnel lens plate 40' is used as shown in FIG. 6 and FIG. 7, side faces of the Fresnel lens plate 40' exist in the display regions of the display panels 10 and 20, and thus may unfavorably affect displaying. In order to suppress this, it is preferable to ensure that the side face portions of the Fresnel lens plate 40' are polished surfaces, or that the Fresnel lens plate 40' is thin.

Figure 8:
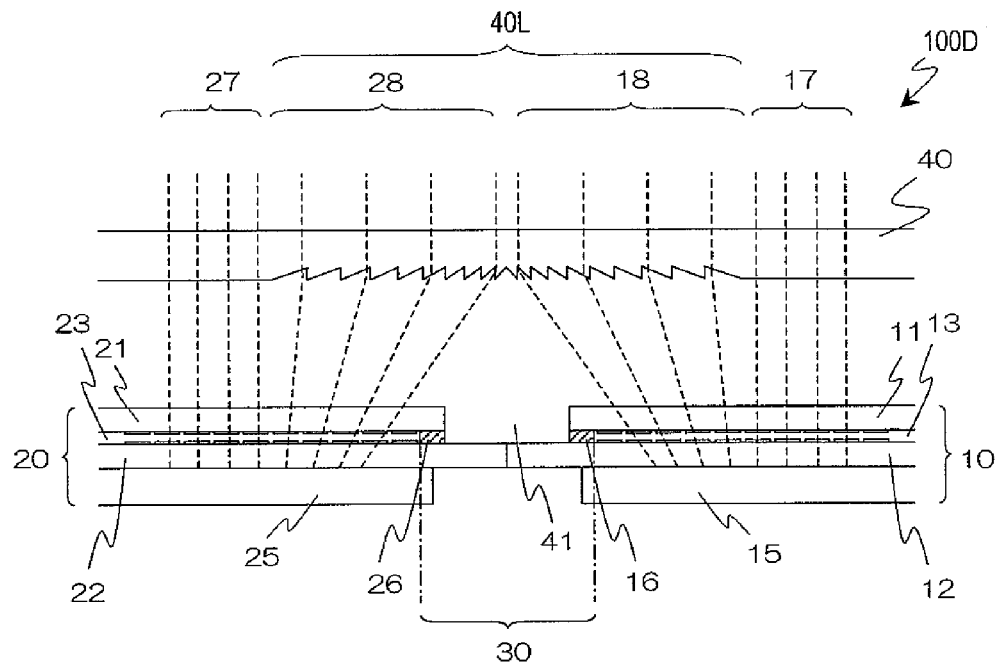
FIG. 8 A schematic cross-sectional view of another display device 100D according to an embodiment of the present invention.

Moreover, as in a display device 100D shown in FIG. 8, the lens shapes to be formed on Fresnel lens plate 40 may be disposed so that the ridges of the Fresnel lens region 40L face toward the display panels 10 and 20. Adopting such an arrangement is advantageous in that scratches are unlikely to be made on the face having the ridges of the Fresnel lens region 40L formed thereon, and that soil is easily wiped off. It will be appreciated that, even when such an arrangement is adopted, as in FIG. 6, regions other than the Fresnel lens region 40L may be omitted. Moreover, the Fresnel lens plate 40 may be supported in the non-display region 30 by using a pillar.

From the standpoint of optical characteristics, as illustrated for the display devices 100A to 100C, it is preferable that the ridges formed on the Fresnel lens region 40L are disposed on the viewer side. Adopting this arrangement provides an advantage in that a reflectance of about 4% at the Fresnel lens region 40L (assuming a refractive index of 1.5) is obtained for external light entering the Fresnel lens region 40L from the viewer side, without performing any particular anti-reflection treatment.

[Signal Processing]

In the display device according to an embodiment of the present invention, as has been described above, an image of a peripheral display region is displayed in a region corresponding to a non-display region in a stretched-out manner. Therefore, in order to realize normal displaying, it is preferable that the images to be displayed in the peripheral display regions are subjected to a previous compression before being displayed. There are following two methods of displaying a compressed image.

Figure 9:
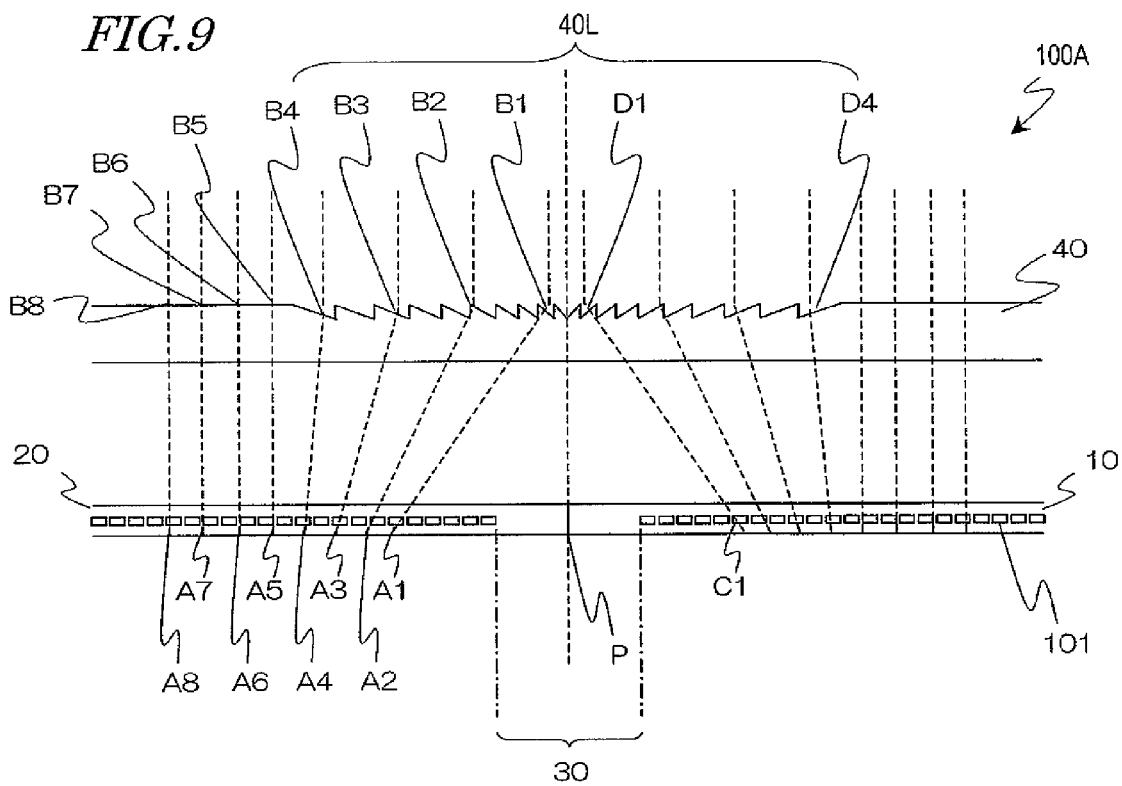
FIG. 9 A schematic cross-sectional view for describing a manner in which images appear (front) in the display device 100A according to an embodiment of the present invention.

Method 1: a method of displaying a compressed image in a peripheral display region by signal processing, while the pixel pitch is kept constant across the entire display panel (FIG. 9).

Figure 10:
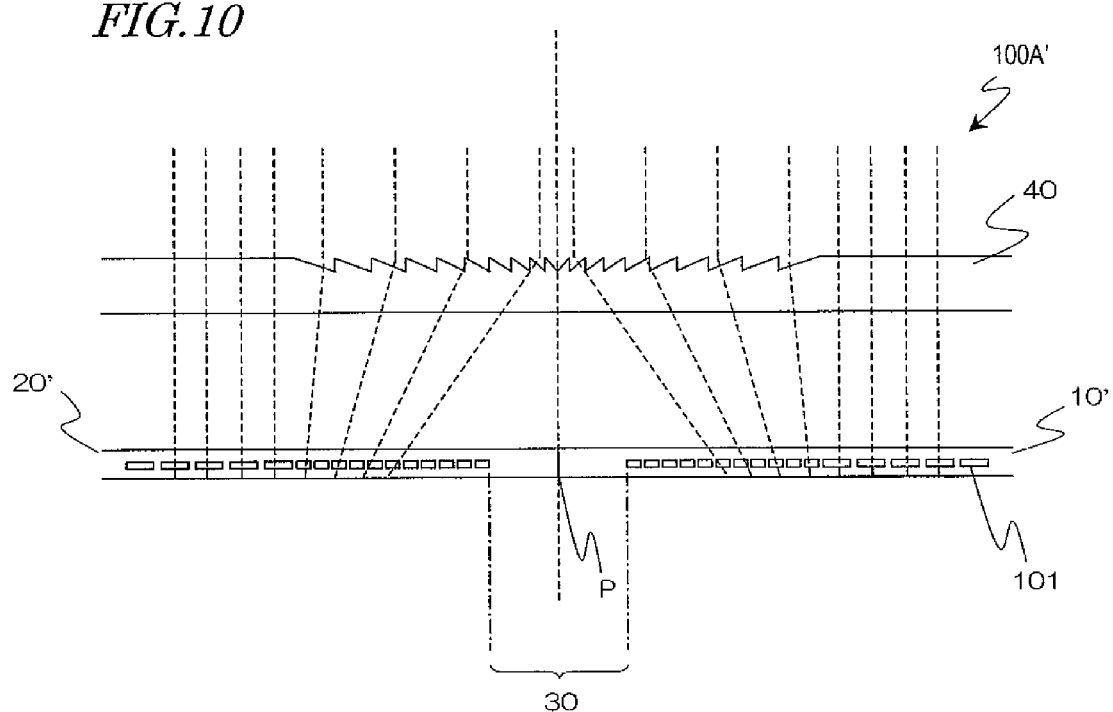
FIG. 10 A schematic cross-sectional view for describing a manner in which images appear in a display device 100A', whose pixel pitch is made narrower in a peripheral display region than in any other region.

Method 2: a method of, as in a display device 100A' shown in FIG. 10, making the pixel pitches of the display panels 10' and 20' narrower (compressed) in the peripheral display regions than in any other region, thus displaying compressed images without performing signal processing. Although Method 2 does not require any special signal processing, it is necessary to fabricate specially-designed display panels, thus resulting in problems such as poorer versatility and cost.

On the other hand, Method 1 has an advantage in that commonly-used display panels can be used, although it requires signal processing. In particular, since the display device according to an embodiment of the present invention has an advantage of allowing a tiling technique to be applied with a simple structure by using a display unit which is accommodated in a housing, Method 1 will be particularly advantageous as described above.

Method 1 will be described in detail with reference to FIG. 9.

FIG. 9 is a cross-sectional view schematically showing the above-described display device 100A. The display panels 10 and 20 each include a plurality of pixels 101 which are arrayed with a constant pitch across the entire display region.

Rays shown by broken lines in FIG. 9 go out from regions A1 to A8 of the display panel 20, and are transmitted through the Fresnel lens plate 40, so as to go out from regions B1 to B8 of the Fresnel lens plate 40. The center (middle) of the non-display region 30 along the X axis is denoted as P. In the following descriptions, the regions A1 to A8 of the display panel 20, a region C1 of the display panel 10, and the like will each correspond to one pixel 101, basically.

A ray going out from the region A1 of the display panel 20 is refracted by the region B1 of the Fresnel lens plate 40, which is the closest to the center P of the non-display region 30, and goes out in the display plane normal direction (hereinafter may simply be referred to as the "normal direction").

Rays going out from the regions A2 and A3 of the display panel 20 are refracted by the regions B2 and B3 of the Fresnel lens plate 40, and go out in the normal direction.

A ray going out from the region A4 of the display panel 20 is refracted by the endmost region B4 of the Fresnel lens region 40L, and goes out in the normal direction.

Rays going out from the regions A5 to A8 of the display panel 20 are transmitted through the planar region (i.e., a region other than the Fresnel lens region 40L) of the Fresnel lens plate 40, and go out in the normal direction from the regions B5 to B8.

In other words, since the image to be displayed by the regions B1 to B4 is an image which is being displayed by the regions A1 to A4 (see the peripheral display region 20D in FIG. 2), the image to be displayed by the regions B1 to B4 must be displayed in a compressed form by the regions A1 to A4. On the other hand, an image which is displayed by the regions A5 to A8 (the display region other than the peripheral display region) goes out from the regions B5 to B8 without being refracted, so that the image does not need to be compressed. In other words, the display panels 10 and 20 need to display images which are compressed only in some regions that are close to the frame regions (peripheral display regions 10D and 20D). Herein, since the display panel 10 and the display panel 20 are disposed along the horizontal direction (or also said to be disposed along the X axis), the display signals may be compressed along the X axis. Moreover, the regions B1 to B4 have varying intervals. Specifically, as can be seen from the broader intervals existing closer to the center P along the X axis, the compression rate needs to be increased toward the frame region.

Similarly, rays going out from the region C1 of the display panel 10 go out in the normal direction from the region D1, which is the closest to the center P of the non-display region 30.

When the two display panels 10 and 20 are to be observed from the display plane normal direction, the condition that images would appear jointless is that the displayed images are continuous between the region A1 and the region C1.

The above description is directed to the case where the display plane of the display device 100A is observed from the display plane normal direction. Next, a case of observing it from an oblique direction will be described.

Any region that is closer to the non-display region 30 than is the region A1 is a region which is invisible from the display plane normal direction, and becomes visible only when observed from a direction which is tilted from the display plane normal direction.

Figure 11:
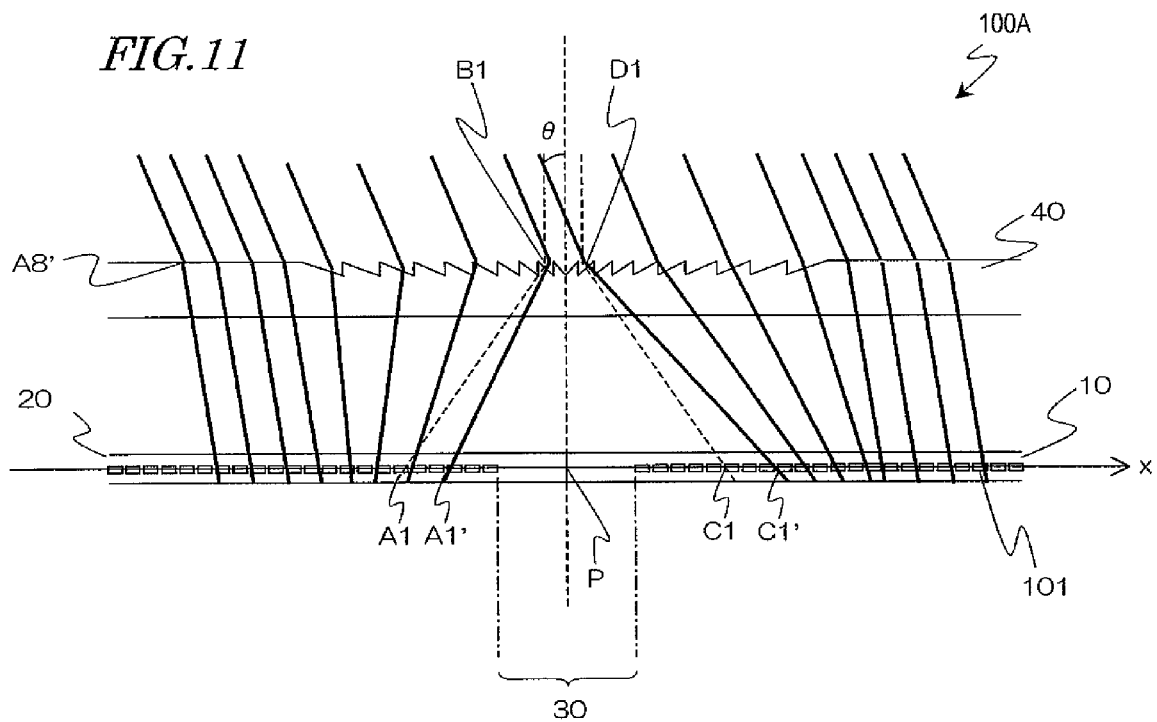
FIG. 11 A schematic cross-sectional view for describing a manner in which images appear (oblique viewing angle direction) in the display device 100A according to an embodiment of the present invention.

For example, as schematically shown in FIG. 11, when the display device is observed from a direction which is tilted by θ toward the display panel 20 from the display plane normal direction, the region (pixel) through which a ray to be displayed in the region B1 on the Fresnel lens plate 40 goes out will change from the region A1 to a region A1', whereas the region through which a ray to be displayed in the region D1 on the Fresnel lens plate 40 will change from the region C1 to a region C1'.

In other words, when the two display devices are observed from a direction which is tilted by θ from the display plane normal direction, the portion to appear as a joint between images will move from the joint position when observed from the display plane normal direction, i.e., the position at which the images of the region A1 and the region C1 are displayed, to the position where the images of the region A1' and the region C1' are displayed.

The condition that the image will appear continuous at this joint portion is that the displayed images are continuous between the region A1' and the region C1'.

Therefore, by compressing the image which is displayed in a region that is closer to the non-display region 30 than is the region A1 based on a relationship between the angle θ and the coordinates of the regions A1' and C1' as obtained from the designed lens shapes, a jointless and continuous appearance can be ensured not only in the case where the display panel is observed from the display plane normal direction but also an angle which is tilted by a certain angle θ.

Figure 12:
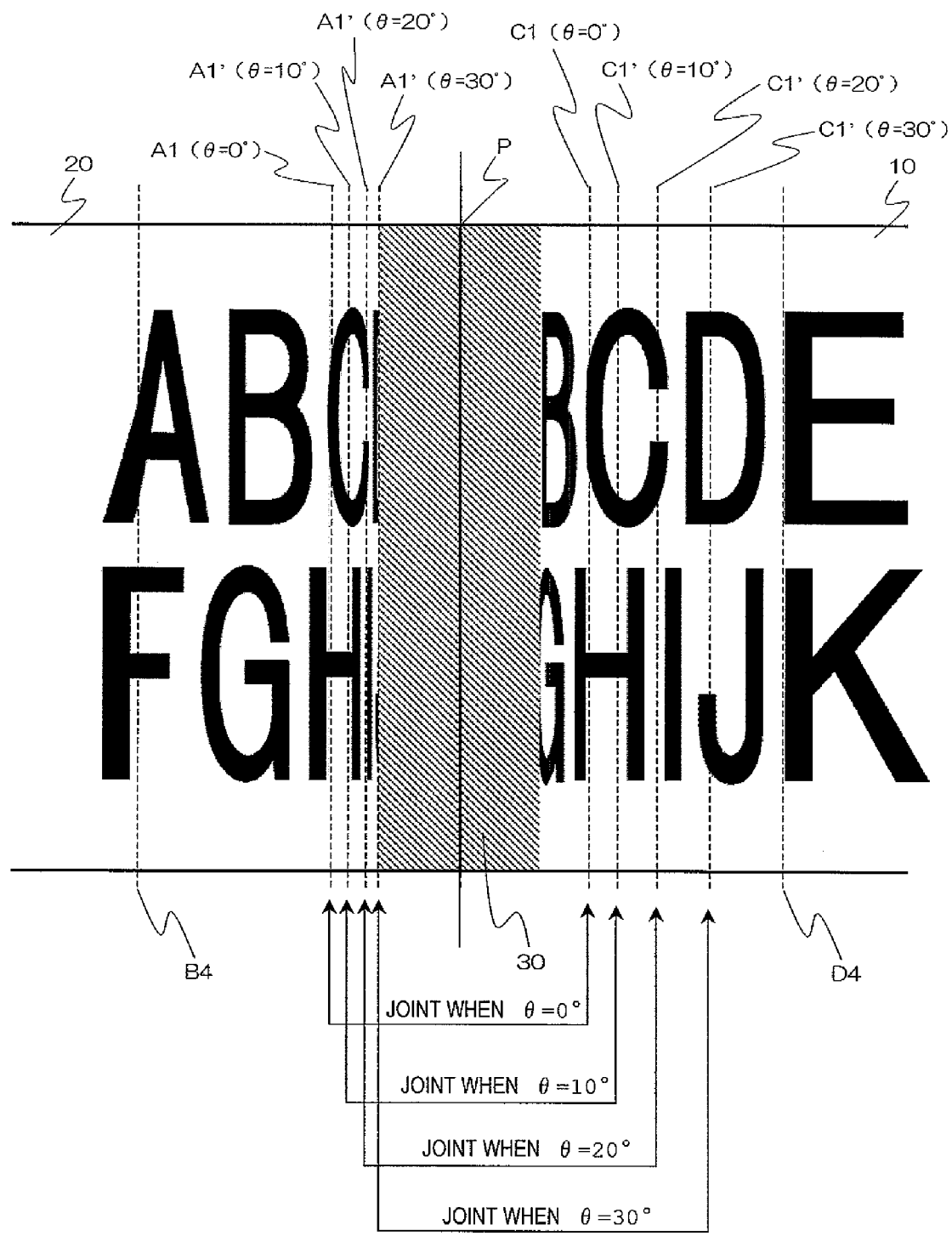
FIG. 12 A diagram schematically showing images which are displayed near a joint portion between display panels 10 and 20 of the display device 100A according to an embodiment of the present invention.

Examples of displayed images are specifically shown in FIG. 12.

FIG. 12 is a diagram schematically showing images which are displayed near a joint portion between the display panels 10 and 20, illustrating a case where alphabetical letters A to K are displayed side by side.

Figure 13:
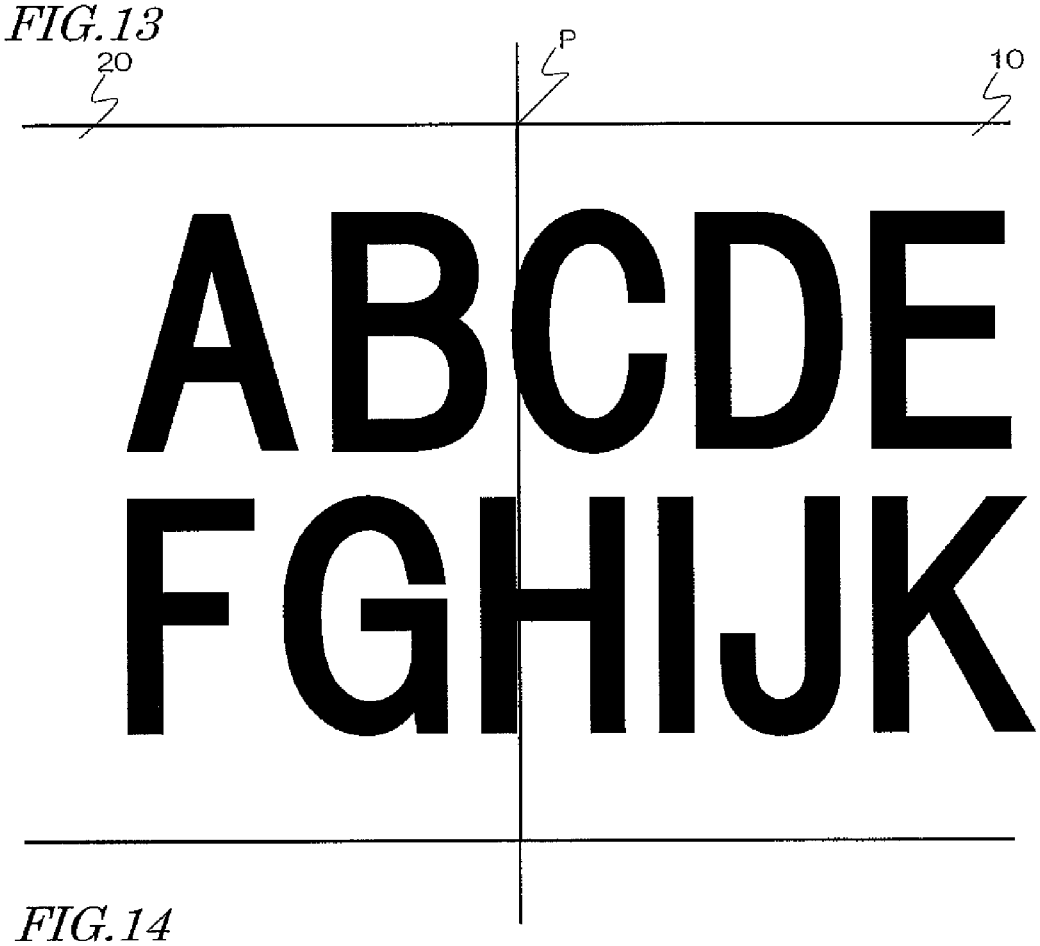
FIG. 13 A diagram showing an image obtained when the images shown in FIG. 12 are observed via the Fresnel lens plate 40.

When these displayed images are observed through the Fresnel lens plate 40, the rays are refracted so that a continuous image without the non-display region 30 will appear, as shown in FIG. 13.

In the regions outside the region B4 and the region D4, where the Fresnel lens region 40L is not formed, usual uncompressed images are displayed.

In the region from the region B4 to the region A1, an image to be displayed in between the region B4 and the center P when being observed through the Fresnel lens plate (Fresnel lens region 40L) from the display plane normal direction is displayed in a compressed form.

Similarly, in the region from the region D4 to the region C1, an image to be displayed in between the region D4 and the center P when being observed through the Fresnel lens plate 40 from the display plane normal direction is displayed in a compressed form.

In other words, the images displayed in the region A1 and the region C1, which are at a joint when being observed through the Fresnel lens plate 40 from the display plane normal direction, are continuous. Therefore, the screens of these two display devices appear continuous when observed from the display plane normal direction.

When being observed with a tilt of θ=10° from the display plane normal direction, what is at a joint is the images displayed in the region A1' (θ=10°) and the region C1' (θ=10°), and therefore the image in the region A1' (θ=10°) is converted so as to be continuous with the image in the region C1'

(θ=10°). In other words, the display signals are compressed along the X axis. Stated otherwise, the image to be displayed in between the region C1 and the region C1' (θ=10°) is displayed in a form compressed in between the region A1 and the region A1' (θ=10°).

When being observed with a tilt of θ=20° from the display plane normal direction, what is at a joint is the images displayed in A1' (θ=20°) and C1' (θ=20), and therefore the image in the region A1' (θ=20°) is converted so as to be continuous with the image in the region C1' (θ=20°). Stated otherwise, the image to be displayed in between the region C1' (θ=10°) and the region C1' (θ=20°) is displayed in a form compressed in between the region A1' (θ=10°) and the region A1' (θ=20°).

When being observed with a tilt of θ=30° from the display plane normal direction, what is at a joint is the images displayed in the region A1' (θ=30°) and the region C1' (θ=30°), and therefore the image in the region A1' (θ=30°) is converted so as to be continuous with the image in C1' (θ=30°). Stated otherwise, the image to be displayed in between the region C1' (θ=20°) and the region C1' (θ=30°) is displayed in a form compressed in between the region A1' (θ=20°) and the region A1' (θ=30°).

With respect to the region from the region C1 over to the non-display region, by similarly processing images for displaying, continuous images can be observed from either of the right and left directions.

Since the present embodiment is designed so that a continuous view is obtained with a viewing angle (polar angle) of 30° or less, it is ensured that the region A1' (θ=30°) coincides with the end of the non-display region 30.

It will be appreciated that this is only an exemplary design. By changing the lens shapes and the processing conditions (compression ratio) for the display signals, it becomes possible to perform continuous displaying with a wider viewing angle.

In the present embodiment, images are converted by the unit of every 10°, this being for convenience of signal processing. More preferably, signal conversion may be performed by a finer unit, e.g., 1°, whereby naturally continuous images can be obtained to even greater details.

Coordinates values for the region A1' and region C1' exemplified herein are shown in Table 1. Assuming that the horizontal direction of the display plane is the X axis, the point of the center P is the origin; the direction of the display panel 10 is +; and the direction of the display panel 20 is −, then the angle θ and the coordinates of the regions A1' and C1' are as shown in Table 1. By compressing the displayed images according to these coordinates, it becomes possible to perform jointless and continuous displaying through the Fresnel lens plate 40, up to θ=30°.

TABLE 1

| direction θ | A1' | C1' |
| --- | --- | --- |
| 0° | −75.8 | 75.8 |
| 10° | −62.9 | 92.6 |
| 20° | −54.4 | 115.8 |
| 30° | −48.0 | 147.1 |

Those regions which are under image compression are displayed while being stretched out by the Fresnel lens plate 40, and therefore have a slightly deteriorated displaying luminance. This problem can be suppressed by increasing the luminance of the pixels of the region to be subjected to image compression (i.e., peripheral display region) over those of the other regions. In the case of a liquid crystal display panel, in the backlight devices 15 and 25 disposed on the rear face side, the intensity of light going out toward the peripheral display region may be increased over the intensity of the light going out toward the other portions.

Figure 14:
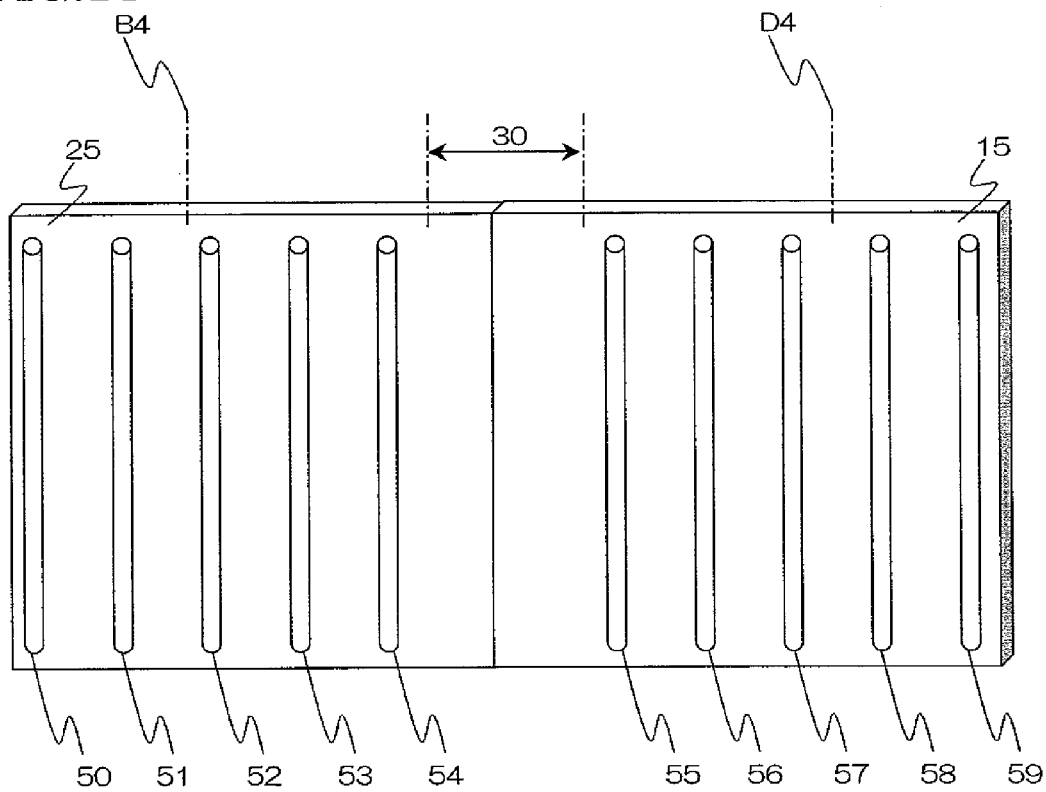
FIG. 14 A diagram describing a backlight device used for a display device according to an embodiment of the present invention.

For example, in the backlight devices 15 and 25 shown in FIG. 14, in which fluorescent lamps are placed side by side, an improvement can be achieved by ensuring that fluorescent lamps 52, 53, 54, 55, 56, and 57 which are in regions to be subjected to image compression are lit so as to be brighter than the other fluorescent lamps.

Figure 15:
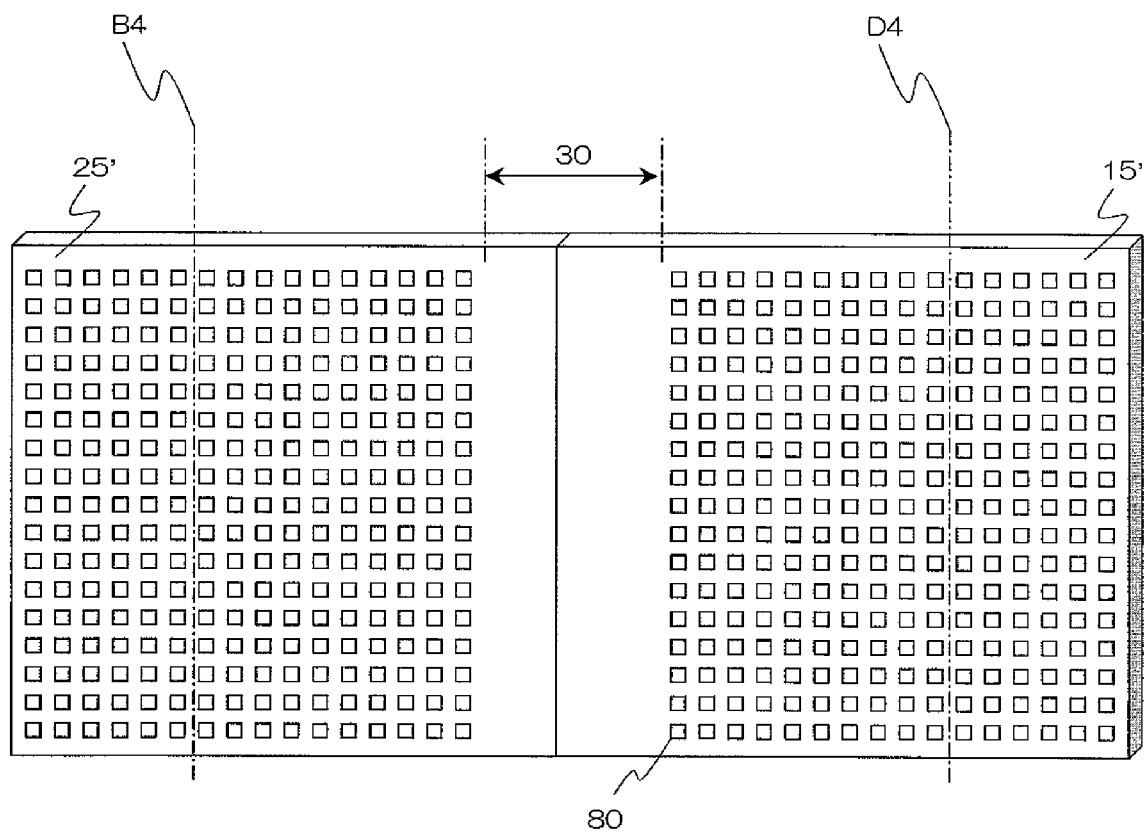
FIG. 15 A diagram describing another backlight device used for a display device according to an embodiment of the present invention.

Moreover, in backlight devices 15' and 25' shown in FIG. 15, in which LEDs (light-emitting diodes) 80 as light sources are placed in a matrix shape, by allowing those LEDs 80 which are in regions to be subjected to image compression to emit light with a higher intensity than do those LEDs 80 in regions not to be subjected to image compression, uniformity in screen luminance can be enhanced.

In the case of employing backlights in which LEDs are used as light sources, there is a technique, e.g., what is called an active backlight method, of allowing the emission intensities of LEDs to vary between split display regions of a matrix so as to match the bright and dark portions of a displayed image, thus improving the contrast of the displayed image. In a display device adopting such an active backlight method, through mere circuit adjustments, it can be easily ensured that only the LEDs in region to be subjected to image compression emit light with a higher intensity than usually, and thus the uniformity in screen luminance of the present embodiment can be easily enhanced.

Note that the LEDs may be of a white emission type, or groups of LEDs emitting three colors of R, G, and B may be arrayed.

Although the above-described present embodiment illustrates an example where two display panels are connected along the lateral direction, it will be appreciated that the number of display panels is not limited to two. More display panels may be placed side by side for displaying a continuous image.

Figure 16:
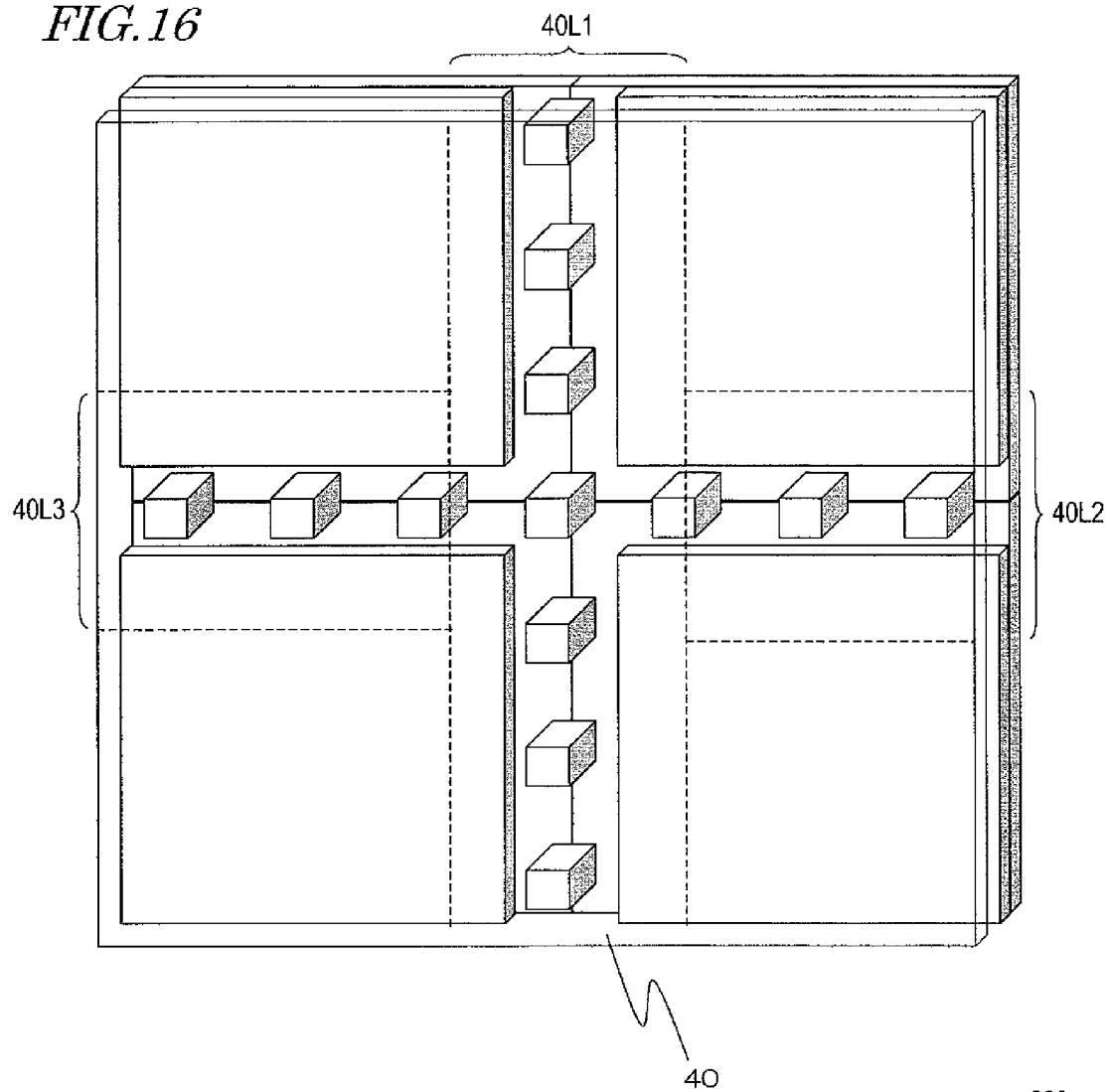
FIG. 16 A schematic perspective view of another display device according to an embodiment of the present invention.

They can also be connected along the vertical direction. Furthermore, as in a display device shown in FIG. 16, four display panels may be connected vertically and horizontally in a matrix shape. In this case, a Fresnel lens region 40L1 which is provided corresponding to the portion of horizontal adjoining is a linear Fresnel lens having ridges extending along the vertical direction, whereas Fresnel lens regions 40L2 and 40L3 which are provided corresponding to the portion of vertical adjoining are linear Fresnel lenses having ridges extending along the horizontal direction.

Figure 17:
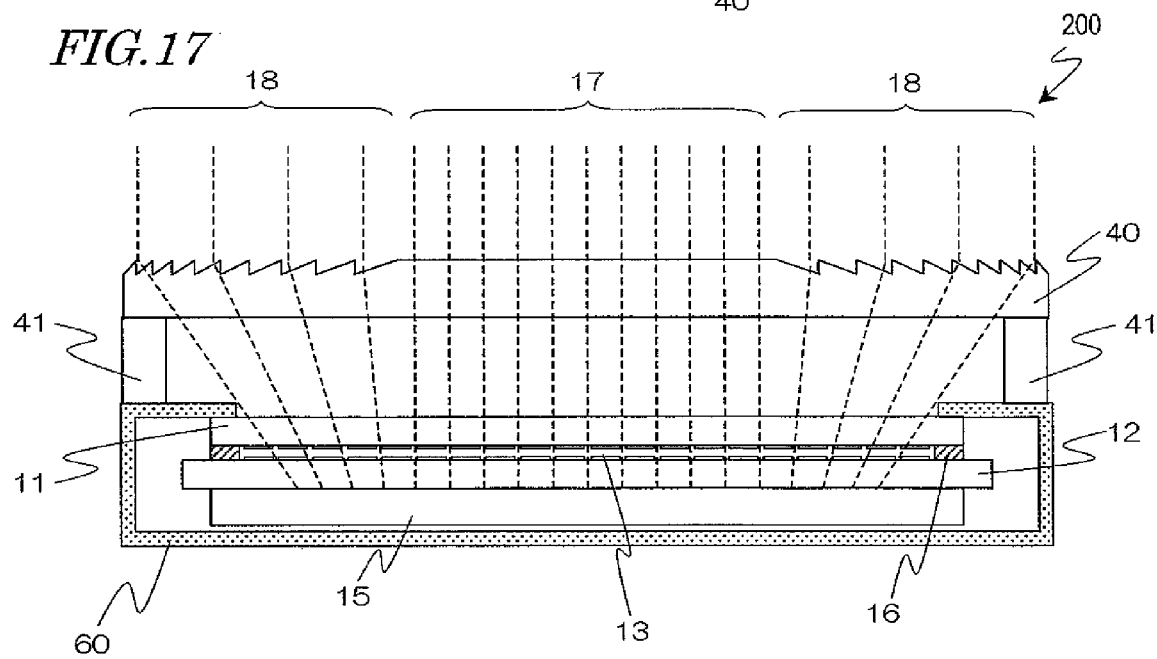
FIG. 17 A schematic cross-sectional view of another display device 200 according to an embodiment of the present invention.

Furthermore, there is also an applicability to a display device which only includes a single display panel, as in a display device 200 shown in FIG. 17.

The display device 200 includes a Fresnel lens plate 40 which is provided in a display unit having a liquid crystal display panel, a backlight device 15, and a housing 60. The housing 60 is made of a commonly-used plastic material.

The housing 60 has a frame width which is about 24 mm in the case of a commonly-used monitor, for example, and this is equivalent to the width of the non-display region discussed above. By straightforwardly applying the aforementioned construction to the region of the housing 60 corresponding to a frame, the frame of the housing 60 can be made invisible. Specifically, in the Fresnel lens plate 40, the peripheral display region and the frame region, as well as any portion around it, of the display panel is the Fresnel lens region 18, so that light going out from the peripheral display region of the display panel is refracted in the display plane normal direction.

For example, to demonstrate design values for a Fresnel lens plate whose frame width is 24 mm, when a V-groove shaped convex lenses having a radius of curvature 110 mm is to be made into a Fresnel lens, its thickness is 2 mm; the formed width of the Fresnel lens is 95 mm; and the distance between the Fresnel lens plate and the display panel is 54 mm.

Preferably, the Fresnel lens plate 40 is formed so as to be at least larger than the display region of the display panel, and is fixed outside the display region by using a pillar 41, so as not to disturb displaying.

As described above, according to the present invention, there is provided a display device in which a frame region of a display panel, or a joint in the case of tiling, is made unlikely to be seen, with a structure which is more simple and light-weighted than conventionally. Moreover, by merely placing an appropriately designed Fresnel lens plate at a predetermined position of an existing display panel or a display unit, a frame region of a display panel, or a joint in the case of tiling, can be made unlikely to be seen. On the other hand, display devices which are connected in a matrix shape not only can realize a super large screen, but also are easy to transport when disassembled, thus being very useful.

INDUSTRIAL APPLICABILITY

The present invention is suitably used for a large-sized direct-viewing type display device.

The invention claimed is:

1. A direct-viewing type display device comprising:
at least one display panel including a display region and a frame region located outside of the display region; and
at least one Fresnel lens plate disposed on a viewer side of the at least one display panel with a predetermined interval therefrom; wherein
the at least one Fresnel lens plate includes a Fresnel lens region at a position overlapping a region that contains a portion of the frame region of the at least one display panel and a portion of a peripheral display region within the display region that adjoins the portion of the frame region along a first axis;
a portion of display light exiting the portion of the peripheral display region is emitted from a region of the Fresnel lens region that overlaps a portion of the frame region, or a region outside the region, toward the viewer side;
the at least one display panel includes a plurality of pixels arrayed with a constant pitch across the entire display region; and
display signals to be supplied to a plurality of pixels existing in the portion of the peripheral display region are compressed along the first axis at different compression ratios.

2. The display device of claim 1, wherein luminance of display light emitted from the at least one display panel is higher in the portion of the peripheral display region than in any other portion.

3. The display device of claim 2 further comprising a backlight device, wherein,
the at least one display panel is a liquid crystal display panel; and
an intensity of light emitted from the backlight device toward the portion of the peripheral display region is higher than an intensity of light emitted toward any other portion.

4. The display device of claim 1, wherein the Fresnel lens region includes a plurality of ridges, the plurality of ridges being formed on the viewer side.

5. The display device of claim 1, wherein the at least one display panel is accommodated in a housing, the Fresnel lens region of the at least one Fresnel lens plate having a portion overlapping the housing.

6. A direct-viewing type display device, comprising:
at least one display panel including a display region and a frame region located outside of the display region; and
at least one Fresnel lens plate disposed on a viewer side of the at least one display panel such that an air layer with a predetermined thickness is provided between the at least one Fresnel lens plate and the viewer side of the at least one display panel; wherein
the at least one Fresnel lens plate includes a Fresnel lens region at a position overlapping a region that contains a portion of the frame region of the at least one display panel and a portion of a peripheral display region within the display region that adjoins the portion of the frame region along a first axis;
a portion of display light exiting the portion of the peripheral display region is emitted from a region of the Fresnel lens region that overlaps a portion of the frame region, or a region outside the region, toward the viewer side;
the at least one display panel includes two display panels disposed so as to adjoin each other along the first axis;
the Fresnel lens region of the at least one Fresnel lens plate is a continuous region containing portions of the frame regions of the two display panels such that the portions adjoin each other along the first axis; and
a pillar disposed in the portions of the frame regions of the two display panels such that the portions of the frame regions of the two display panels adjoin each other along the first axis, the pillar maintaining the predetermined thickness of the air layer that is positioned between the two display panels and the at least one Fresnel lens plate.

7. The display device of claim 6, wherein,
the two display panels include a plurality of pixels arrayed with a constant pitch across the entire display region; and
the display signals to be supplied to a plurality of pixels existing in the portion of the peripheral display region are compressed along the first axis.

8. The display device of claim 7, wherein the display signals to be supplied to a plurality of pixels existing in the portion of the peripheral display region are compressed along the first axis at different compression ratios.

9. The display device of claim 8, wherein the display signals to be supplied to a plurality of pixels existing in the portions of the peripheral display regions adjoining the portions of the frame regions of the two display panels such that the portions adjoin each other along the first axis contain identical display signals.

10. The display device of claim 6, wherein the relationship $a < d \cdot X/Y$ is satisfied, where, a is a width of the pillar along the first axis; d is a thickness of the at least one Fresnel lens plate; X is an overall width of the portions of the frame regions of the two display panels such that the portions adjoin each other along the first axis; and Y is a distance from viewer side surfaces of display medium layers of the two display panels to a viewer side surface of the at least one Fresnel lens plate.

11. The display device of claim 6, wherein the at least one Fresnel lens plate includes a single continuous Fresnel lens plate which extends over and between the two display panels, which are adjacent to each other.

12. A direct-viewing type display device, comprising:
at least one display panel including a display region and a frame region located outside of the display region; and at least one Fresnel lens plate disposed on a viewer side of the at least one display panel with a predetermined interval therefrom; wherein the at least one Fresnel lens plate includes a Fresnel lens region at a position overlapping a region that contains a portion of the frame region of the at least one display panel and a portion of a peripheral display region within the display region that adjoins the portion of the frame region along a first axis;

a portion of display light exiting the portion of the peripheral display region is emitted from a region of the Fresnel lens region that overlaps a portion of the frame region, or a region outside the region, toward the viewer side;

the at least one display panel includes two display panels disposed so as to adjoin each other along the first axis;

the Fresnel lens region of the at least one Fresnel lens plate is a continuous region containing portions of the frame regions of the two display panels such that the portions adjoin each other along the first axis; and the Fresnel lens region includes a plurality of ridges extending along a second axis which is perpendicular to the first axis, the second axis being parallel to pixel rows of the at least one display panel.

* * * * *